D. A. FANGHAENEL.
Improvement in Egg-Carriers.
No. 128,793.  Patented July 9, 1872.
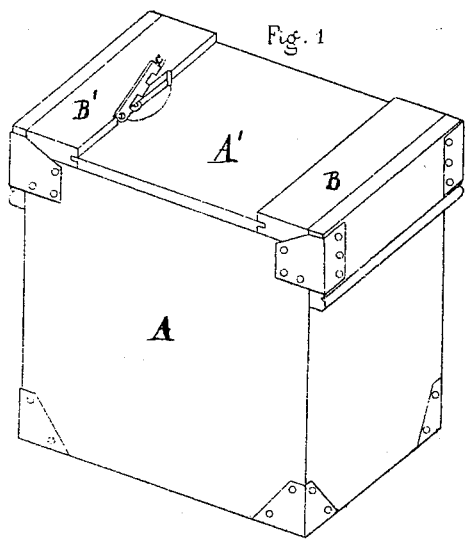
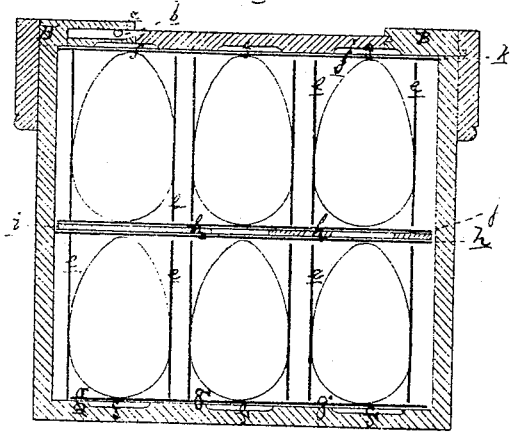
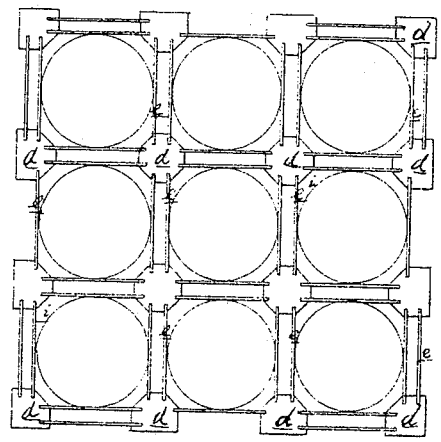

UNITED STATES PATENT OFFICE.

DANIEL AUGUST FANGHAENEL, OF KANSAS CITY, MISSOURI.

IMPROVEMENT IN EGG-CARRIERS.

Specification forming part of Letters Patent No. 128,793, dated July 9, 1872.

*To whom it may concern:*

Be it known that I, DANIEL AUGUST FANG-HAENEL, of Kansas City, in the county of Jackson and State of Missouri, have invented a new and useful Improvement in Egg-Carrier; and I do declare that the following is a true and accurate description thereof, reference being had to the accompanying drawing and to the letters of reference marked thereon, and being a part of this specification, in which—

Figure 1 is a perspective view of my improved egg-carrier case or box. Fig. 2 is a cross-section on the line $x\ x$ in Fig. 1. Fig. 3 is a plan of one of the carrier-frames.

Like letters refer to like parts in each figure.

This invention has for its object to provide a box or case in which eggs may be packed for transportation without danger of breaking them; and it consists in a box provided with a series of cellular frames of peculiar construction, whereby each egg is isolated from every other egg by elastic walls and partitions. The egg-frames are made of a number of polygonal wooden posts, $d$, in the edges of which narrow gains are sawed or cut in pairs to receive the edges of pasteboard partitions $e$, which form rectangular cells, each of which contains a single egg placed on end. The partitions $e$ are sufficiently elastic to yield to any lateral impact from the egg without allowing it to come in contact with the next egg or the adjacent partition. The bottom of the case has circular depressions $f$ cut in it at the points where the eggs would rest on it, and on the bottom of the case a sheet of pasteboard, $g$, is laid, before the lower egg-frame is placed therein, to protect the butts of the eggs from impact on the wood. On top the lower frame another sheet, $h$, of the same material, is laid, and on this a sheet, $i$, of the straw-board is laid. This sheet is perforated with a circular opening over each cell, and on top of this another sheet, $j$. On this another frame is laid and covered with a pasteboard sheet, $k$. The under side of the cover has circular depressions $f$ cut in it like those of the bottom, and for a like purpose, while the perforated sheet between the frames protects the ends of the eggs, the straw-board sheets $h\ j$ giving to any impact of the eggs. Any convenient number of frames may be packed in the case, and the cells may vary in capacity to receive eggs of various sizes. It will be noticed that in every direction the eggs are surrounded with elastic walls, so that in ordinary usage of the box the eggs cannot be broken.

What I claim as my invention, and desire to secure by Letters Patent, is—

1. The depressions $f$ in the inner faces of the cover and bottom of the box, in combination with the pasteboard sheets, as described.

2. The egg-carrying frame, composed of the wooden posts $d$ having the pasteboard partitions $e$ secured in pairs in grooves at their sides to form egg-cells with elastic double walls, substantially as described and shown.

3. The interposition of the perforated sheet $i$, with a solid sheet of straw-board below and above it between the egg-carrying frames, as and for the purpose set forth.

DANIEL AUGUST FANGHAENEL.

Witnesses:
JOHANN F. HORNEL,
THEODOR STEINBACH.